Jan. 14, 1969

W. C. GALLAGHER 3,421,958

METHOD OF FORMING REINFORCED RUBBER TAPE AND HELICALLY WINDING SAME TO FORM AN UNVULCANIZED BAND

Filed March 16, 1965

INVENTOR.
WILLIAM C. GALLAGHER

BY

*J.B. Holden*
ATTORNEY

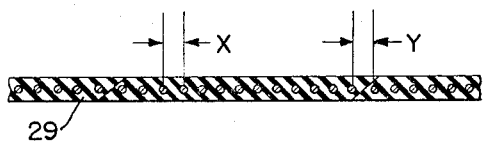
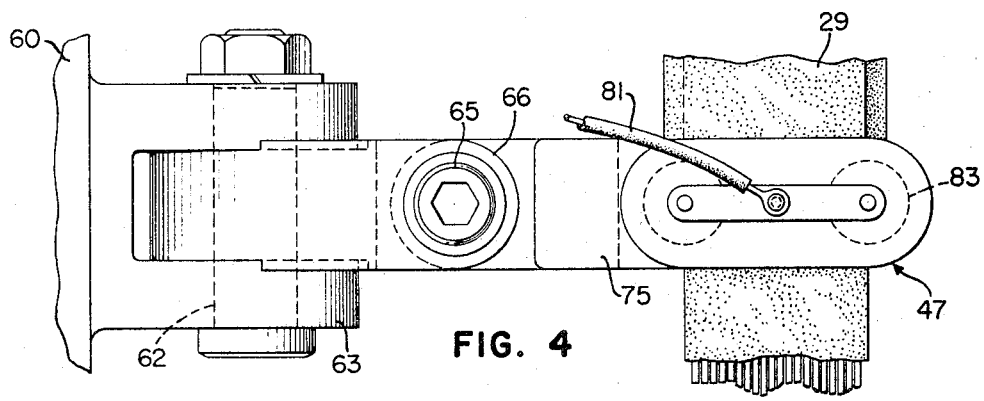
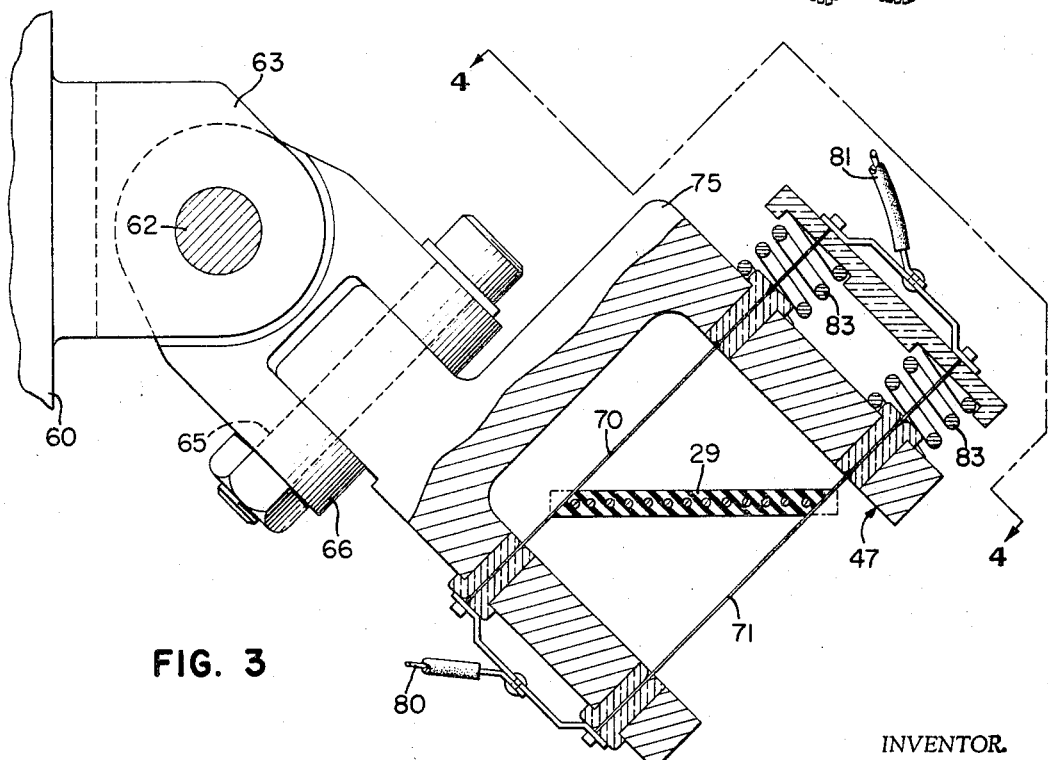

United States Patent Office 3,421,958
Patented Jan. 14, 1969

1

3,421,958
METHOD OF FORMING REINFORCED RUBBER TAPE AND HELICALLY WINDING SAME TO FORM AN UNVULCANIZED BAND
William C. Gallagher, Akron, Ohio, assignor to The Goodyear Tire & Rubber Company, Akron, Ohio, a corporation of Ohio
Filed Mar. 16, 1965, Ser. No. 440,084
U.S. Cl. 156—192     3 Claims
Int. Cl. B29h 9/04; B29h 17/28

ABSTRACT OF THE DISCLOSURE

The method of forming an unvulcanized band helically reinforced by elongated continuous parallel reinforcing members which method comprises encapsulating a plurality of such reinforcing members with rubber to form a tape, parallelly beveling and heating the longitudinal edges of the tape and then winding the tape into a band by continuously butt splicing opposite heated beveled edges of the tape.

---

The foregoing abstract is not to be taken as limiting the invention of this application, and in order to understand the full nature and extent of the technical disclosure of this application, reference must be made to the accompanying drawings and the following detailed description.

This invention relates to the production of a band of helically reinforced unvulcanized rubber from which tire plies are cut. The invention includes both the process and the apparatus used.

British Patent 919,078 describes apparatus for encapsulating elongated reinforcing members in rubber in an extruder and forming a tape therefrom, and then winding the tape on a continuous surface to produce a band from which tire plies are cut. The edges of tapes made and used as there described will become distorted between the extruder which coats the cords with unvulcanized rubber, and the continuous surface upon which the encapsulated tape is wound.

According to this invention, the edges of a tape formed by encapsulating elongated reinforcing members in rubber are cut on a bias just prior to being wound on a continuous surface. It is preferable to cut the edges with heated means. The tape with beveled edges is butt-spliced to tape previously wound on the surface, preferably while the freshly beveled edge is still hot from the cutting operation.

The elongated reinforcing members in the tape may be wire or cords of textile material such as nylon, polyester, rayon, etc. They are preferably fed to an encapsulator from let-offs on a creel. Tensioning devices are used to control the tension on the reinforcing members in order to produce a flat band from the tape. Well-known equipment may be utilized for the production of the encapsulated tape.

The band may be formed from the tape on a rigid drum or on a belt which may be supported on three arms, and this latter is preferred because the diameter of the band produced in this way can be varied by changing the distance between two of the arms and positioning the third arm to take up the slack, or the tape may be formed directly over a plurality of rollers rather than on a continuous surface.

In order to provide for continuous operation of the encapsulator, it is necessary to employ a festoon between the encapsulator and the band-forming equipment. In passing over the sheaves of the festoon, the tape edges tend to become distorted.

According to this invention, the edges of the tape are beveled, parallel to one another, just prior to forming

2 the band. This insures having the edge of the tape, as it is spliced, smooth and at any desired angle. It is desirable to use a hot cutting edge or to heat the tape just prior to or after such cutting, so that the tape reaches the winding device in a heated condition to facilitate splicing.

The invention is further described in connection with the accompanying drawings, in which:

FIGURE 3 is an enlarged elevational detail of the hot wire cutter;

FIGURE 4 is a plan view of the same; and

FIGURE 5 is an enlarged section through a band formed by splicing several tapes.

Figure 1:
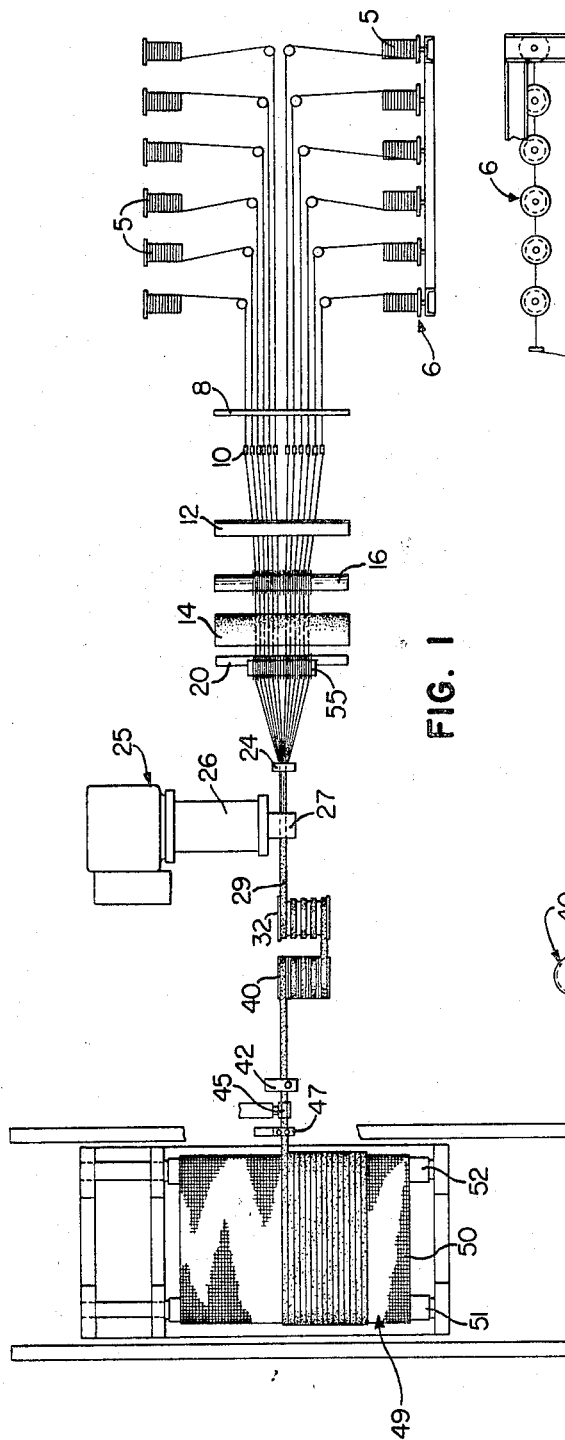
FIGURE 1 is a plan piew in the nature of a flow sheet, showing the different units of the apparatus and the method in which they are employed.
Figure 2:
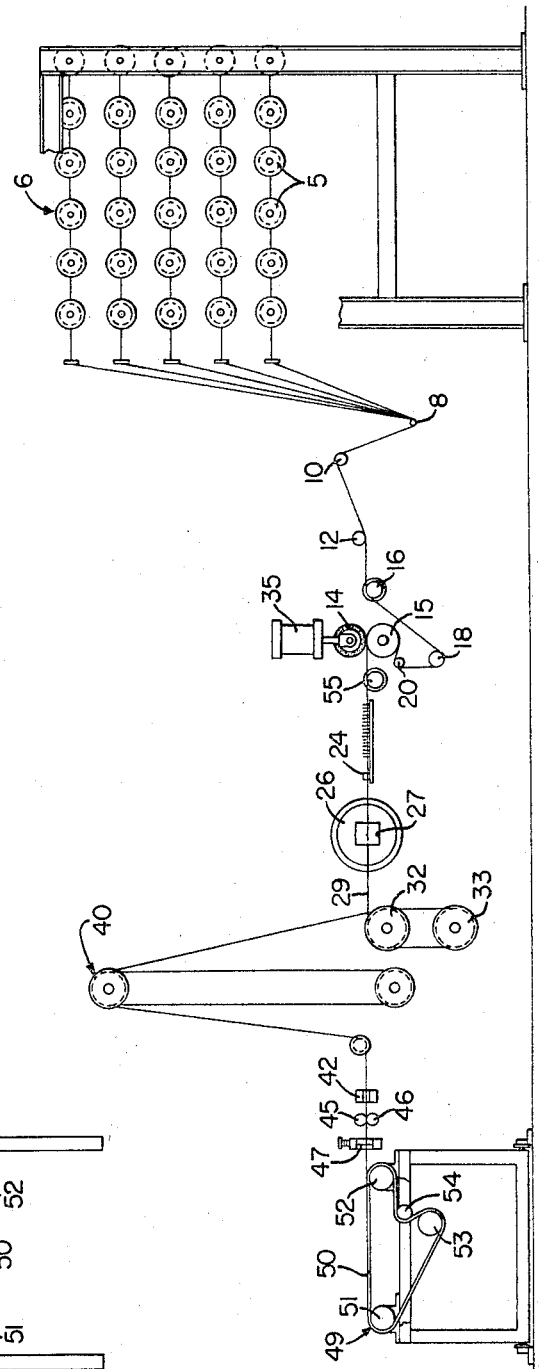
FIGURE 2 is an elevation of the equipment shown in FIGURE 1.

The invention will be described in connection with the production of tire plies from polyester cords. The cords are spliced from let-offs 5 in the creel 6. They pass under the roll 8 to individual tension compensators 10, and then under the roll 12 to the tension-release rolls 14 and 15. The roll 14 is neoprene coated and the roll 15 is a steel roll. The cords pass from the roll 12 through the comb 16 down under the rotating roll 18 and then over the rotating roll 20 and wrap about 200 degrees around the steel roll 15 which may, for example, be about 10 inches in diameter. The neoprene-coated roll 14 applies pressure to the cords as they pass between it and the steel roll 15. This is a well-known type of tension-relief device.

The cords, after passing through the tension-compensation device 10, are maintained under a tension of about 5 pounds until they pass between the rolls 14 and 15 where tension is reduced to under one pound or thereabouts. In this way, as the cords leave the tension-release device, they are all under identical low tension, and the tape that is formed lies flat on the belt. If the tension from cord to cord is not identical the tape will ripple laterally, i.e. from side to side. If the tension of the cords is too high (i.e. greater than about 1.5 lbs.) the tape will ripple longitudinally.

The rotating roller combs 16 and 55 are designed to keep the cords aligned as they pass through the tension-release rolls and then the cords pass through the width-reducing comb 24. From here the cords pass through the encapsulator 25. Rubber is fed through the extruder 26 into the encapsulator head 27 where the rubber is extruded around the cords to form the tape 29.

The cords are pulled through the aforesaid equipment by the pull rolls 32 and 33 which are driven by suitable means. The roll 15 is also advantageously driven by the same driving means. The pressure of the roll 14 against the roll 15 is regulated by the air cylinder 35 so that the pressure of the neoprene-coated roll 14 on the driven steel roll 15 precisely controls the tension of the cords as they leave the tension-release device.

The festoon 40 operates in the usual way to take up any slack in the tape due to changes in the speed at which the tape passes through the balance of the equipment.

In order to provide for feeding the tape to the wind-up on which the band is formed, so that the incoming tape abuts the tape that is already formed into the band, it is desirable to provide a guiding device 42 which may be a so-called Askania guide, which controls the lateral movement of the wind-up device so as to butt-splice the tape in the most advantageous manner, as illustrated in FIGURE 5. If the wind-up device is moving too fast the distance y between cords on opposite sides of a splice is greater than the distance x between adjacent cords within a tape and a gap results between the tape edges. If the wind-up device is moving too slowly the tape edges are overlapped. The optimum splice is formed when the distance $y$ between cords on opposite sides of a splice is the same as the distance $x$ between adjacent cords in a tape.

From the guiding device 42 the tape preferably passes between the guide rolls 45 and 46 to the hot wire trimmer 47. Here both edges of the tape are trimmed with a hot wire or the like to the desired bevel angle. Both edges are cut at the same angle, parallel to one another. Then the tape passes on to the wind-up device where one hot beveled edge abuts the conversely beveled edge of the band already formed, and the two are spliced together. As apparent from the drawings and particularly FIGURE 1, the tape is of substantially lesser width than the band which is to be formed from the tape, and the tape is wound a plurality of times about the wind-up device 49 with one longitudinal beveled edge of each turn of the tape being butt spliced to the next adjacent oppositely beveled longitudinal edge of a next adjacent turn of the tape. Where necessary, pressure means, such as a roller under tension, may be used to press the abutting edges together.

The wind-up device 49 may be a mere drum or a series of rollers, but is shown as comprising the belt 50 which is held under tension by the three rollers 51, 52 and 53. The roller 54 takes up slack and keeps the belt under tension. The spacing of the rolls 51 and 52 may be varied as desired, to produce a band of greater or less diameter.

Other cutting devices may be employed rather than the hot-wire cutter which is shown in detail in FIGURES 4 and 5. Hot razors or other knives, or other cutting devices such as lasers or high-energy radio-frequency rays.

Details of the preferred hot wire edge trimmer are shown in FIGURES 3 and 4. This is advantageously pivotally attached to the side of a block 60 attached above the frame of the wind-up device 49 so that it can pivot vertically about the horizontal pivot 62 held in the yoke 63, and also pivot longitudinally of the frame about the pivot 65 held in the yoke 66. The tape 29 travels perpendicularly to the axis of the belt 50. By raising the yoke 66 about the pivot 62, the angles at the edges of the tape 29 formed by the hot wire cutters 70 and 71 approach 90 degrees, and if this yoke is dropped the angles approach 180 degrees. By moving the frame 75 about the pivot 65 the width of the tape is increased or decreased. Thus, by this device the width of the tape is controlled and the edge angles are controlled.

The rubber trimmed from the edge of the tape by the hot wires 70 and 71 should contain no cord material, and therefore as the width of the tape 29 is varied by adjusting the angle of the frame 75, the tape is made wider or narrower to brace any desired number of cords. The spacing is kept constant, so that if the tape is narrow there are no cords in the end portions which are trimmed away by the hot knives 70 and 71.

By beveling the edges of the tape the greatest exposure of hot rubber to hot rubber is formed, and united to form the butt splice. It is therefore desirable first to adjust the angle of the frame about the pivot 65 to regulate the width of the tape which is cut by the two wires and then adjust the yoke 66 about the pivot 62 to obtain the widest possible exposure on the edges of the tape. With a high cord count the angles of the side edges must approach 90 degrees. With a smaller cord count a greater angle is possible, except that the angle is also dependent upon the width of the tape which is formed.

The drawing shows the lead wires 80 and 81 to carry current to the hot cutting wires 70 and 71. These wires are maintained under tension between springs 83.

The invention is covered in the claims which follow. What I claim is:

1. The method of forming an unvulcanized band for use in the manufacture of a tire comprising encapsulating a plurality of continuous parallel reinforcing members in rubber to form an elongated tape having a width substantially less than that of the band to be formed, parallely beveling the longitudinal edges of the tape, and winding the tape helically and in a plurality of turns while continuously butt splicing next adjacent beveled edges of next adjacent turns of the tape.

2. In the method as claimed in claim 1, heating the longitudinal edges of the tape prior to the winding of the tape into a band.

3. In the method as claimed in claim 2, said beveling and heating of the said longitudinal edges of the tape being carried out simultaneously by means of heated cutting means.

References Cited

UNITED STATES PATENTS

| 2,688,996 | 9/1954 | Loomis | 156—134 |
| 2,340,040 | 1/1944 | Carlin | 156—133 XR |
| 3,237,673 | 3/1966 | Ward | 156—134 XR |
| 2,262,636 | 11/1941 | Cuno | 156—258 XR |

FOREIGN PATENTS 1,055,619  10/1953  France.

PHILIP DIER, *Primary Examiner.*

U.S. Cl. X.R.

156—195, 258, 304